G. O. LAWSON.
CHERRY PITTER.
APPLICATION FILED JULY 27, 1922.

1,428,789.  Patented Sept. 12, 1922.

WITNESSES
Laurence Besley
Ellsworth A. Smith

INVENTOR.
Guy O. Lawson.

Patented Sept. 12, 1922.

1,428,789

UNITED STATES PATENT OFFICE.

GUY O. LAWSON, OF ELMIRA HEIGHTS, NEW YORK.

CHERRY PITTER.

Application filed July 27, 1922. Serial No. 577,973.

*To all whom it may concern:*

Be it known that GUY O. LAWSON, a citizen of the United States of America, residing at Elmira Heights, in the county of Chemung and State of New York, has invented new and useful Improvements in Cherry Pitters, of which the following is a specification.

The object of this invention is to provide a simple and inexpensive, yet efficient culinary tool whereby the seeds or pits of cherries and like relatively delicate fruits or berries may be removed without squeezing or crushing the fruit as is done in removing same by the unaided hand so that the fruit may be served uncooked or may be cooked or preserved in its natural condition of beauty and symmetry without being cut, crushed or disfigured.

The invention consists of two prongs somewhat roughened to prevent slipping and bent upward and inward at their reduced ends forming a spoon-like receptacle which readily penetrates the fruit and as readily withdraws the seed. It may be provided with any substantial handle.

Figure 1:
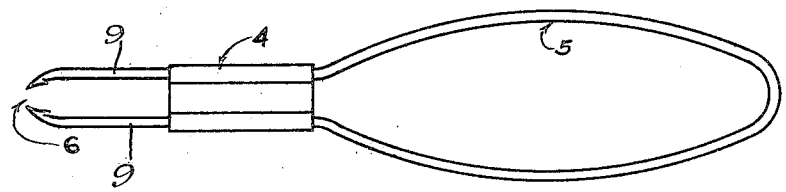
Figure 2:
Figure 3:

In the drawing, Fig. 1 shows the side view; Fig. 2 an edge view, and Fig. 3 a view of the working end. The drawings show the instrument made with a wire handle which, for simplicity consists of a continuation of the wire of which the working ends are constructed, wire being bent to form a handle as at 5 in Fig. 1, while the ends are brought around to comparatively close proximity as at 6 in Fig. 1 and are held in position by a clip No. 4, Fig. 1. The ends are roughened, reduced and bent upward as shown at 8, Fig. 2, and also inclined inward, as shown in end view at 7, Fig. 3.

The device consists of jaws 9, Fig. 1, substantially parallel, reduced to comparatively sharp points at the ends and bent upward and inward as above set forth.

In use the device is grasped in one hand like a paring knife, the sharp points thrust into the fruit, held in the other hand, preferably in the stem end, the jaws engaging the pit, when a slight pressure of the thumbs together with a twisting movement serves to draw forth the pit, leaving only a slight opening in the fruit, which retains practically all its juice.

Having described the invention, what is claimed as new and useful is:—

1. A fruit pitting implement having substantially parallel laterally spaced jaws provided with upturned reduced extremities.

2. A fruit pitting implement having substantially parallel laterally spaced jaws provided with upturned reduced extremities disposed at an inclination toward each other.

3. As an article of manufacture a fruit pitting implement consisting of a blank of wire of looped form wherein the intermediate portion or loop of the blank forms a grip or handle and the terminals thereof are arranged in substantially parallel relation and are provided with laterally deflected reduced extremities.

4. As an article of manufacture a fruit pitting implement consisting of a blank of wire of looped form wherein the intermediate portion or loop of the blank forms a grip or handle and the terminals thereof are arranged in substantially parallel relation and are provided with laterally deflected reduced extremities, a jaw engaging clip being arranged in spanning relation therewith to hold the same in a fixed position.

In testimony whereof he affixes his signature.

GUY O. LAWSON.

Witnesses:
LAWRENCE BESLEY,
ELLSWORTH A. SMITH.